Oct. 2, 1956 — J. G. MACORMACK — 2,764,788
SEALING GASKET
Filed March 26, 1952 — 3 Sheets-Sheet 1
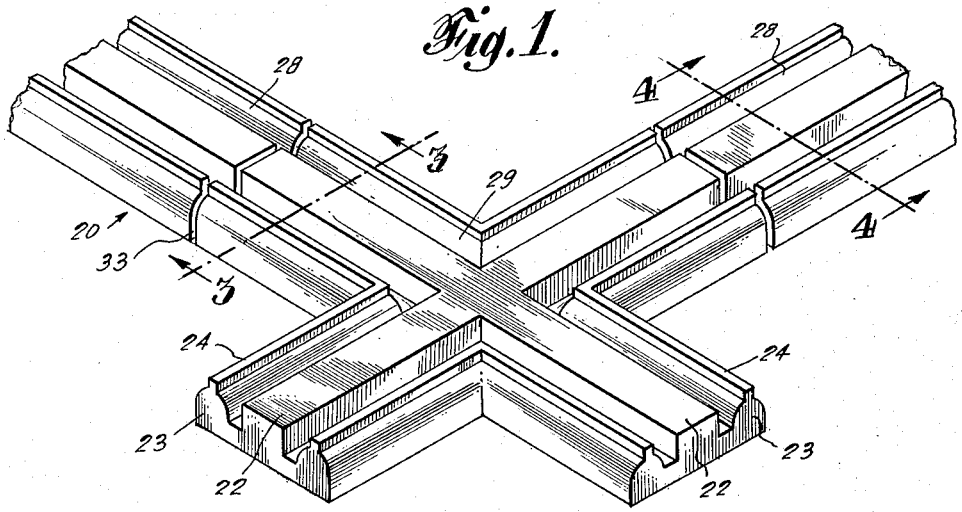
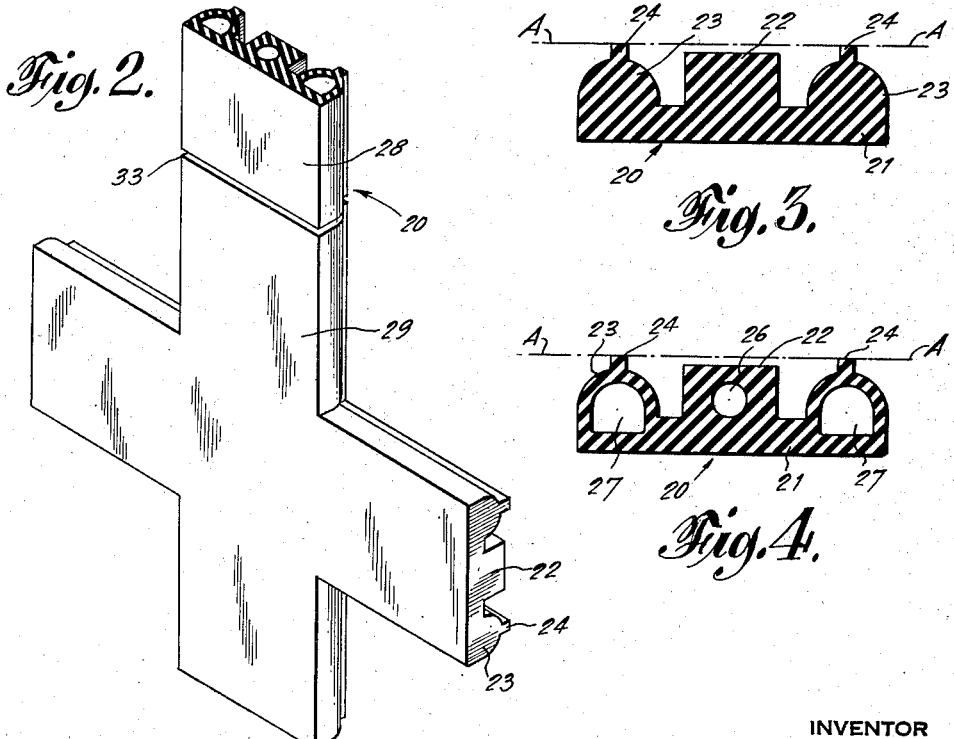
INVENTOR
JAMES G. MACORMACK
BY
ATTORNEY Oct. 2, 1956   J. G. MACORMACK   2,764,788
SEALING GASKET
Filed March 26, 1952   3 Sheets-Sheet 2

INVENTOR
JAMES G. MACORMACK
BY
ATTORNEY

Oct. 2, 1956    J. G. MACORMACK    2,764,788
SEALING GASKET
Filed March 26, 1952    3 Sheets-Sheet 3
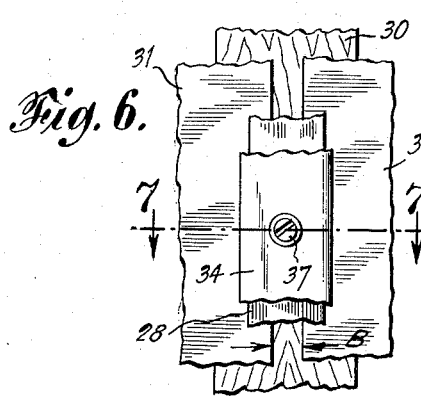
Fig. 6.
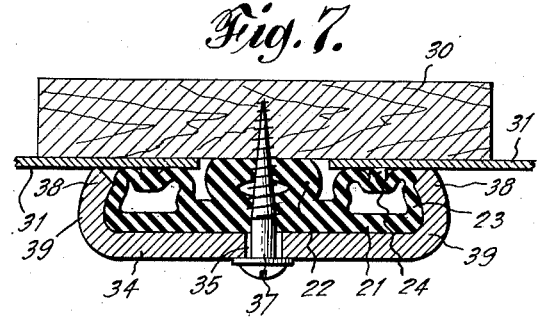
Fig. 7.
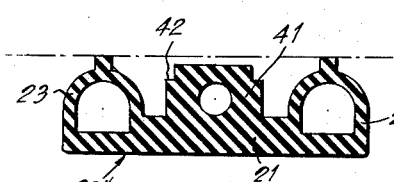
Fig. 9.
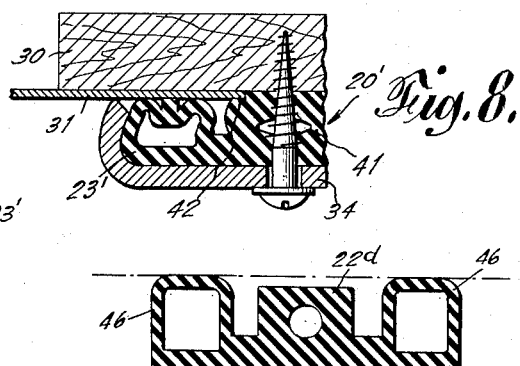
Fig. 8.
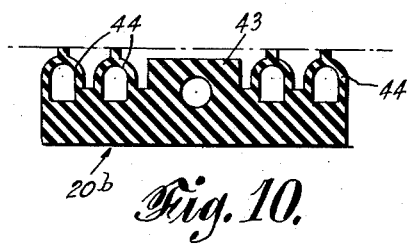
Fig. 10.
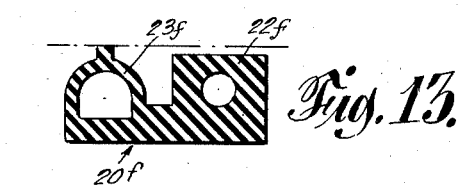
Fig. 12.
Fig. 13.
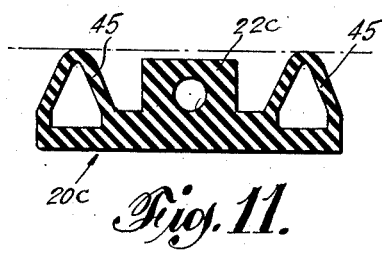
Fig. 11.
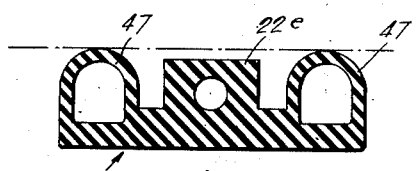
Fig. 14.
INVENTOR
JAMES G. MACORMACK
BY
ATTORNEY

United States Patent Office 2,764,788
Patented Oct. 2, 1956

2,764,788

SEALING GASKET

James G. Macormack, Mount Kisco, N. Y., assignor to Alumiseal Corporation, New York, N. Y., a corporation of New York Application March 26, 1952, Serial No. 278,572

5 Claims. (Cl. 20—69)

This invention relates to a sealing gasket for the insulating and sealing of joints in a wall structure and is more particularly concerned with a seal-joint means for wall and like structures which are likely to expand or contract under changes of temperature.

For example, in rooms or like enclosures for testing aviation instruments, extremes of high and low temperature and high and low humidity are provided for such tests, in order to simulate atmospheric conditions of all kinds which are likely to be encountered in the field. When a particular desired condition has been established in the test room, it is necessary to precisely maintain this condition for the period of time required for the tests and air or moisture vapor leakage into or out of the room can modify the condition and reduce or negate the test.

It is the object of the present invention to provide a seal for a joint which will have many advantages, including temperature and/or vapor sealing, at all times, whether or not the walls or panels forming the enclosure expand or contract.

More particularly, the present invention provides a sealing gasket which maintains two or more adjacent wall panels substantially sealed from transfer of atmosphere therethrough under all conditions of humidity, temperature and equivalent atmospheric factors.

Generally, in practicing the invention, the seal-joint is formed of two essential elements, one firmly fixed to a support, batten or like structure, and the other in yieldable yet sealing contact with a wall panel to be sealed, the two elements being associated together in a unitary strip or sealing gasket, for example, by a web.

Preferably, the elements of the sealing strip comprise an inner or central firm rib, to be attached to the support and two or more spaced apart yieldable outer sealing ribs adapted to make sealing contact yet rolling with the wall panels at their marginal portions, the strip having a cross-section generally of E-shape in this form. The strip is adapted to be compressed, for example, by an embracing metal channel, in order to obtain the firm attachment of the inner rib to the structure or support and the yielding yet rolling and sealing contact of the outer ribs with the marginal portions of the panels.

The inner ribs may be of harder material than the sealing ribs and the latter may be formed hollow to increase their surface contact, rolling action and yieldability when compressed onto the panels.

Specifically, an extruded or molded rubber sealing compression strip of E-shaped cross-section with the inner or center rib of less resiliency than the outer sealing ribs is provided, in one embodiment of the invention, with an outer compressor channel of metal, such as aluminum, embracing the back of the E-shaped strip and attachable, as by screws, to the support structure, such as a wooden framework, to compress the inner rib into firm engagement with the support and the outer yielding ribs into rolling contact with two panels, such as aluminum, to be sealed. The action of the outer yielding ribs is such that as the metal panels contract or expand and thus move relative to each other and to the support, the outer ribs roll with this movement to maintain the seal while permitting the movement.

The contour of the outer ribs is such that this rolling and sealing is augmented. For example, curvilinear surfaces, such as semi-circular outer ribs may be used or V-shaped contours may be adopted. Also, a longitudinally extending bead may be formed at the extremity of each outer rib to make primary contact with the panel, or more than one bead may be so used.

While the compression strip has been stated to have three ribs, as a preferred form, obviously any number of ribs can be used to suit the circumstances of the installation. For example, an inner rib may have two or more outer yielding ribs on either side, or the number of yielding ribs may be uneven on each side of the inner rib.

Basically, any combination of ribs may be used, some being sealing yieldable ribs and the others being firm binding support ribs, whereby any dessired structure may be sealed and any desired degree of sealing may be effected.

Furthermore, the compression strip may be formed not only as a longitudinal element but also as a cross-connection member of any contour such as T-shaped, X-shaped or cruciform.

The outer compressor member may be a channel which will have a contour equivalent to the strip with which it is to be used, and the terminal points thereof may be rounded to serve as a compression limit stop.

Reference will now be made to the accompanying drawings which illustrate, to different scales, several embodiments of the present invention and in which:

Figure 1 is a perspective front view of one form of sealing compression strip according to the present invention;

Figure 2 is a perspective back view of the strip of Figure 1;

Figure 3 is a cross-section of the strip of Figure 1 on the lines 3—3 of Figure 1;

Figure 4 is a cross-section of the strip of Figure 1 on the lines 4—4 of Figure 1;

Figure 6 is a front elevation of a detail of the sealing strip of Figure 1 and the compressor channel of Figure 5 when in assembled position;

Figure 7 is a cross-section of the detail of Figure 6 on the lines 7—7 of Figure 6;

Figure 8 is a detail in section of the strip of Figure 9 when assembled in a compressor channel in sealing contact with a wall structure; and Figure 9 is a cross-section of a modified form of compression strip according to the present invention;

Figure 5:
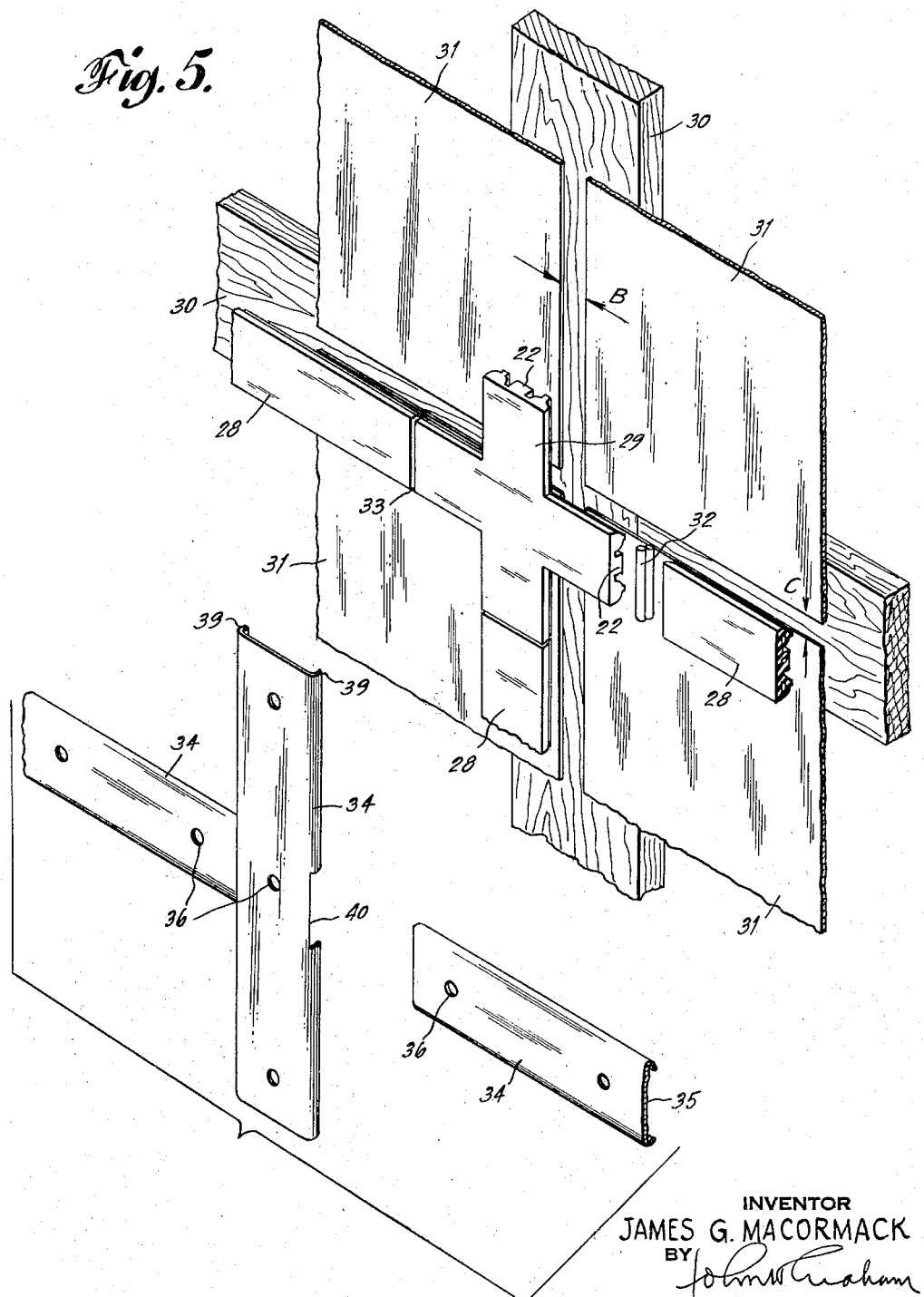
Figure 5 is an exploded view of a wall-panel-support assembly utilizing the joint-sealing means including the strip of Figure 1 and the compressor channel therefor.

Figures 10 to 14 inclusive are enlarged cross-sections of further modifications of compression strips according to the present invention.

In its illustrated form, the compression strip is disclosed as a unitary element having a rib for sealing contact and another rib for substantially rigid attachment to the support but obviously the two ribs may be formed separately and united in any conventional way, with a web common thereto such as on a backing plate, without departing from the spirit and scope of the present invention.

The strip may be molded or extruded of rubber or rubber-like materials known to the art, to provide a unitary structure and the relative yieldability of the ribs may be provided by making those ribs which have rolling-seal with the panels hollow. One or more longitudinal beads of the outer faces of the yielding ribs may also be provided.

Referring now specifically to the drawings, one embodiment of the invention is shown in Figures 1 and 2. The sealing gasket or compression strip specifically shown comprises essentially a strip 20 formed of a flat body member 21 with an upstanding center piece or rib 22 and two spaced apart upstanding projections or ribs 23, spaced from the center piece on either side thereof, the three upstanding ribs 22 and 23 projecting from the body 21 in the same direction to have in cross-section in the form substantially of a letter E.

The strip 20 may be of any desired length and will have a uniform cross-section of E formation throughout. Center rib 22 has a substantially wide, flat face whereas ribs 23 are each of curvilinear or semi-circular cross-section, with the curved portion projecting outwardly. Longitudinally arranged on each rib 23 is a bead 24 of relatively narrow conformation, each bead being carried on the highest point of the curved surface of its rib 23. As will be seen from Figure 3, the beads 24 project, in relaxed condition, beyond the flat face of rib 22, as on the line A of Figure 3.

Strip 20 is formed of somewhat yieldable material, such as rubber, and if therefore it is compressed through its body, the solid center rib 22 will not yield to the same degree as the curvilinear ribs 23. This property of the sealing gasket strip of the present invention is particularly provided to be utilized for obtaining vapor sealing and other sealing properties for expanding wall structures of the type referred to since by causing binding of inner ribs 22 to a support structure element and causing contact of outer ribs 23 each with a separate panel of a metal wall structure, the seal can be maintained under expanding or contracting movements of the panels by the rolling seal action of the outer ribs 23.

To assist in the relative yieldable function of inner ribs 22 and outer ribs 23, these latter may be formed with longitudinal bores whereby each rib 23 is made hollow by a bore 27 (Figure 4), to give greater yield thereof, when radially compressed. Inner rib 22 may also be bored as at 26, Figure 4, to assist in obtaining a firm sealing thereof with the support therefor. Thus, the factor of relative yieldability of the three upstanding rib members 22 and 23 can be modified to suit the use to which the compression strip 20 is to be subjected.

Strips 20 of the cross-section of Figure 3 or 4 can be molded or extruded of rubber or like resilient materials when used in a long strip form such as 28 of Figures 1 and 2, the length of the strips being of any desired value, since they may be readily cut to working lengths. However, when joints which are other than longitudinal and have more than one dimension, such as cross-joints are involved, a molded form 29 is utilized, of contour and size to suit the installation.

As will be readily seen from the illustration of Figures 1, 2 and 5, the cross-bar compression member 29 is substantially an extension of strip 28 in each direction and each arm of member 29 has the same cross-sectional contour as that of its adjacent strip 28.

Member 29 will be molded of rubber and the ribs 22 and 23 thereof will therefore be of solid construction as in Figure 3 but otherwise they will operate as hereinbefore set forth, to permit movement of the wall panels.

In Figure 5 there is shown the various parts of the sealing gasket device in exploded positions in relation to a wall structure to be sealed thereby. Conventionally, the wall structure comprises cross-battens or supports 30 of wood upon which are to be mounted metal panels 31, for example, aluminum sheets to be used as a wall enclosure for an all-weather test room of the type hereinbefore mentioned.

Four panels 31 are shown spaced apart upon the battens 30 by the predetermined margins B and C, whereby expansion of panels 31 in either direction edgewise will be permitted, the width of battens 30 relative to the margins B and C being such that contraction of the panels relative to each other is also permissable.

In order to seal the joints of the panels, in accordance with the present invention, a cross-bar compression strip 29 is applied to the union area of all four panels 31 with the center ribs 22 located within margins B and C and thus in contact with the battens 30 (see Figures 6 and 7), the strip 29 being formed in such proportions that the center rib 22 lies freely within margin B or C with the outer yielding ribs 23 each in contact with the surface of a panel, the strip, in each instance, straddling the batten.

Cross-bar strip 29 is adapted to take care of the area of union of the four corners of each panel 31 and the longitudinal joints of each panel 31 in juxaposition is taken care of by a longitudinal compression strip 28, also with its center rib 22 in contact with the appropriate batten 30 and the outer yielding ribs 23 in sealing contact with the appropriate panels 31. To insure sealing continuity between each arm of cross-unit 29 and its extending strip 28, sealing beads 32, of rubber are arranged therebetween and these are adhesively bonded into place, in any conventional manner, as at 33.

If now the sealing strips 28 and 29 are firmly united with the battens 30, as by compressing the center ribs 22 thereof into engaging contact with the battens, the expanding seal-joint of the present invention will be established.

By forming the base portion 21 of each strip of hard rubber, with or without a reinforcing metal backing, it is possible to unite the sealing strips to the battens by the usual expedient of screwing same down with wood screws for example, but, as a further feature of the present invention, means are provided for applying an even compressive force to the compression strips 28 and 29, in order to achieve the best possible sealing effect thereby.

To this end, there are provided metal channels 34 having back portions 35 of a width and shape to embrace the rear of the strips 28. Channels 34 are bored, as at 36, for wood screws in position to pass these through the body of the strips and through the center ribs 22 into the battens 30. In Figures 6 and 7, an assembled unit is shown with wood screw 37 piercing center rib 22 and entering into a batten 30, compressing strip 28 with the yielding ribs 23 deformed into sealing contact with panels 31.

It may be desirable that the amount of compression of strip 28 or 29 be predetermined in order to obtain the maximum sealing effect of ribs 23 on the panels 31 and the dimensioning of the center rib 22 relative to the outer ribs 23, particularly the difference in height, as per line A of Figures 3 and 4, is chosen to this end. However, it is an additional feature of the present invention to provide the channels 34 with rounded depending edges 38 which are caused to just come into contact with the panels 31, to indicate the limit of compression of strips 28 and 29, the length of the leaves 39 of channels 34 thus acting as a maximum pressure limit stop, whereby each screw 37 will be sent home to such a degree that the compression throughout all the strips used for an installation will be closely similar. Thus, the maximum degree of sealing will be obtained with no danger of one area being more susceptible of failure than other, due to uneven sealing compression.

In order to accommodate cross-units 29, the metal channels 34 may be cut away at the cross-arm portions, at 40, whereby continuous strips of channel 34 may be only provided, cut to working length as desired.

From an examination of Figures 6 and 7, it will readily be seen that the compression of strip 28 is such that the bead 24 is in contact with a panel 31 on each side of center rib 22 and the yielding portions of the ribs 23 may also be in contact as "cheeks" caused by deforming the ribs 23 under compression. If the panels 31 move in either direction edgewise in Figures 6 and 7, the seal will not be broken but a rolling action of the bead 24 and/or the cheeks of ribs 23 will take place, maintaining adequate sealing contact at all times irrespective of the amount of movement of the panels. The rounded edges 38 of channels 34 will not prevent this action since they are intended as a limit of compressive movement and not a clinching engagement with the panels, when they are used as limit stops.

With the compressive strip hereinbefore described, a completely satisfactory and precise seal can be obtained for most installations. However, if desired, the center ribs may be offset or notched to accommodate the edges of the panels to further seal these, for example, under excessive expansion. To this end, as shown in Figures 8 and 9, the strip 28 may have a center rib 41 having a longitudinal step 42 therein at its forward face so that a panel 31 can extend into the groove or notch formed by step 42 when the assembly is completed, as in Figure 8. As the panel 31 expands it will press into the material of the center rib 41, causing sealing of the longitudinal edge of the panel under expansion.

It is obvious that the panel 31 can be mounted in engaging contact with the proximate side face center rib 22 of Figure 7, or within the step 42 of rib 41 of Figure 8 so that the expansion and contraction of the panel does not break this contact, namely, so that the panel is thus sealed at its edge to the center rib at all times.

In Figures 10 to 14 inclusive, modifications of the contour of the compression strip according to the present invention are illustrated.

In Figure 10, the strip 20b has an inner rib 43 with two pairs of outer yieldable ribs 44, arranged with a pair on either side thereof. Ribs 44 are similar in construction to ribs 23 of Figure 4, but are arranged to cause dual sealing on each panel on either side of the inner rib, for greater sealing effect.

Figure 11 shows a modified contour in cross-section for strip 20c having an inner rib 22c of the same shape as in Figure 4 but with outer yieldable ribs 45 of a hollow substantially cone-shaped section with the apex blunted. Figure 12 shows a further modified cross-section for strip 20d having hollow, substantially square, round-cornered yieldable ribs, without beads thereon.

Figure 13 shows a modified form of the strip 20f having only one rib 23f with a rib 22f, this being of use for a terminal panel.

Figure 14 shows a further modified cross-section of strip 20e having hollow square-sided semi-circular ended ribs 47 without beads presenting a large rolling surface for sealing.

Obviously, other similar contours can be utilized within the spirit and scope of this invention for obtaining the novel rolling action under expansion, to provide sealing at all times, even under adverse, precise or highly critical conditions of use, for the purpose described.

The present invention provides sealing means of novel and useful construction comprising essentially a compression strip or gasket preferably held in place by a compressing channel, shield or molding which allows expansion or contraction of the metal wall liner sheets or panels without weakening or breaking the seal because of the rolling seal action of the compression strip. As the panel or wall liner expands it may also become more and more embedded in the center rib of the compression strip, if the assembly is made to permit this, thus effecting additional sealing.

Such a construction lends itself to many usages in building techniques but is particularly applicable to such building techniques where problems of leakage of atmospheres through the walls of the enclosure are present. Such rooms are used exemplarily as test rooms for aviation use, and all-weather test rooms for many purposes, the conditions of tests therein simulating all types of atmospherical conditions and weather conditions encountered throughout the world, such as in the Arctic, Temperate Zone and Tropical regions, or at high altitudes of flying, and are used in the range of temperatures of minus 100° F. or lower up to temperatures several hundred degrees F. above zero. In the range of temperatures above freezing various degrees of humidity conditions are also simulated from as near to complete dehumidification as practical to 100% saturation.

Obviously, therefore, the vapor sealing of the walls and ceilings of such rooms is a vital problem and the expansion and contraction of the metal wall panels presents a difficulty.

By practicing the present invention, the problems of sealing and/or expanding and contracting of the metal wall panels are solved, for the purposes broadly set forth hereinbefore.

What I claim is:

1. A sealing gasket of the type described comprising a substantially E-shaped integrally formed elongated strip of yieldable material, the three legs of which have substantially equal height with the center leg of substantially square cross-section and solid throughout, to give a relatively unyielding center section, said two outer legs being of hollow substantially semi-circular cross-section, to give a relatively yielding outer section on either side of the center section.

2. A sealing gasket according to claim 1, in which each outer leg has an upstanding bead along its length projecting from the leg above the height of the center leg.

3. A sealing gasket according to claim 1 having a small bore through the body of the center leg and longitudinally thereof, to permit some yieldability thereto.

4. A sealing gasket for the purpose described comprising a flat web, a center upright substantially square rib thereon, and a pair of semi-circular ribs thereon, one on either side of said center square rib, the three ribs projecting from said web to form an E cross-section for the gasket, the height of the three ribs from the base of the web to the top faces thereof being substantially the same.

5. A sealing gasket according to claim 4 having hollow semi-circular ribs and a bead running longitudinally on the apex of each of semi-circular ribs, said beads projecting above the top face of said center square ribs.

References Cited in the file of this patent

UNITED STATES PATENTS

| | | |
|---|---|---|
| 1,513,810 | Hawes | Nov. 4, 1924 |
| 1,724,601 | Kellogg | Aug. 13, 1929 |
| 1,864,130 | Gibian | June 21, 1932 |
| 1,883,609 | Dennis | Oct. 18, 1932 |
| 2,263,831 | Welch | Nov. 25, 1941 |
| 2,379,193 | Shields | June 26, 1945 |
| 2,406,629 | Petkwitz | Aug. 27, 1946 |
| 2,560,308 | Spraragen | July 10, 1951 |

FOREIGN PATENTS

| | | |
|---|---|---|
| 568,852 | Great Britain | Apr. 25, 1945 |
| 261,297 | Switzerland | Jan. 3, 1950 |